United States Patent [19]

Baker et al.

[11] Patent Number: 4,477,003
[45] Date of Patent: Oct. 16, 1984

[54] CONDIMENT DISPENSING SYSTEM

[75] Inventors: Forrest E. Baker, San Jose; Norman D. Sullivan, Hollister, both of Calif.

[73] Assignee: Automated Portion Control Technology, Inc., Hollister, Calif.

[21] Appl. No.: 345,288

[22] Filed: Feb. 3, 1982

[51] Int. Cl.³ .......................... B67D 5/02; G01F 11/00
[52] U.S. Cl. .................................. 222/642; 222/148; 222/256; 222/146.6
[58] Field of Search .............. 222/146 R, 146 C, 148, 222/252, 255, 256, 262, 263, 278, 309, 318, 333, 334, 372, 373, 527, 528, 639, 642, 135, 145

[56] References Cited

U.S. PATENT DOCUMENTS

| | | | |
|---|---|---|---|
| 2,134,735 | 11/1938 | Reinhold | 222/262 |
| 3,559,848 | 2/1971 | Standlick | 222/135 |
| 3,876,114 | 4/1975 | Hicks et al. | 222/148 |
| 4,094,445 | 6/1978 | Bevan | 222/146 C |
| 4,372,354 | 2/1983 | Moore | 222/639 X |
| 4,392,592 | 7/1983 | Sullivan | 222/288 |

Primary Examiner—Joseph J. Rolla
Assistant Examiner—Michael S. Huppert
Attorney, Agent, or Firm—Hamrick, Hoffman, Guillot & Kazubowski

[57] ABSTRACT

An apparatus (110) for dispensing condiments, and the like, has a gun (10) arrangeable for dispensing a measured amount of a condiment preloaded into the gun upon release of a trigger (60) of the gun following a previous dispensing action. Provision is made for keeping the condiment refrigerated throughout the system, which can be periodically cleaned in a simple and efficient manner that results in virtually no waste of the condiment or other substance being dispensed.

7 Claims, 8 Drawing Figures

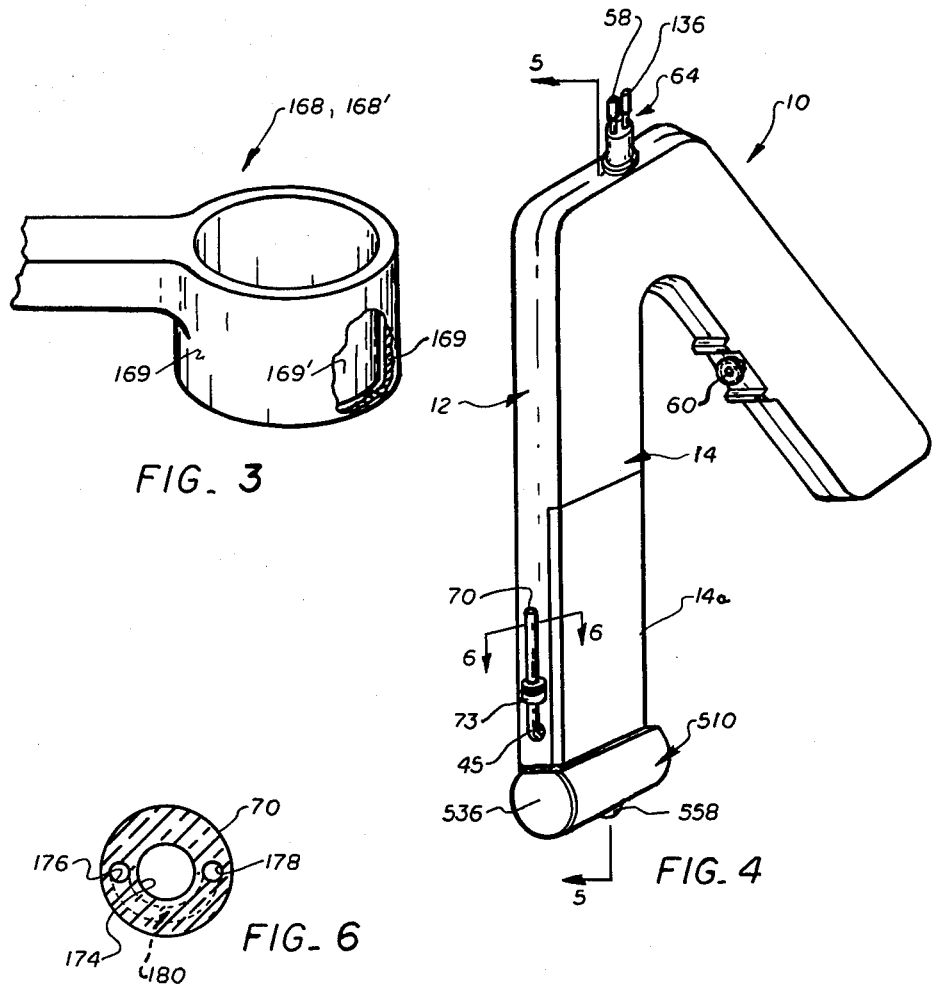

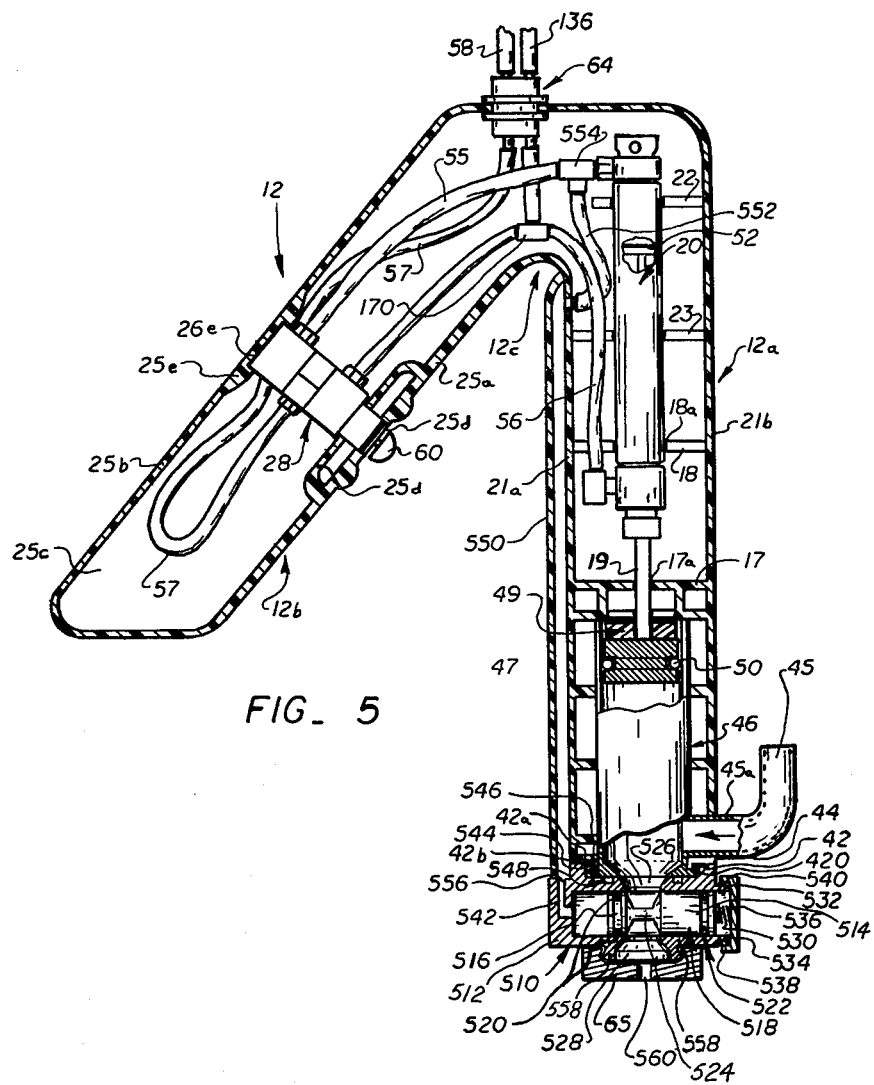
FIG_ 5

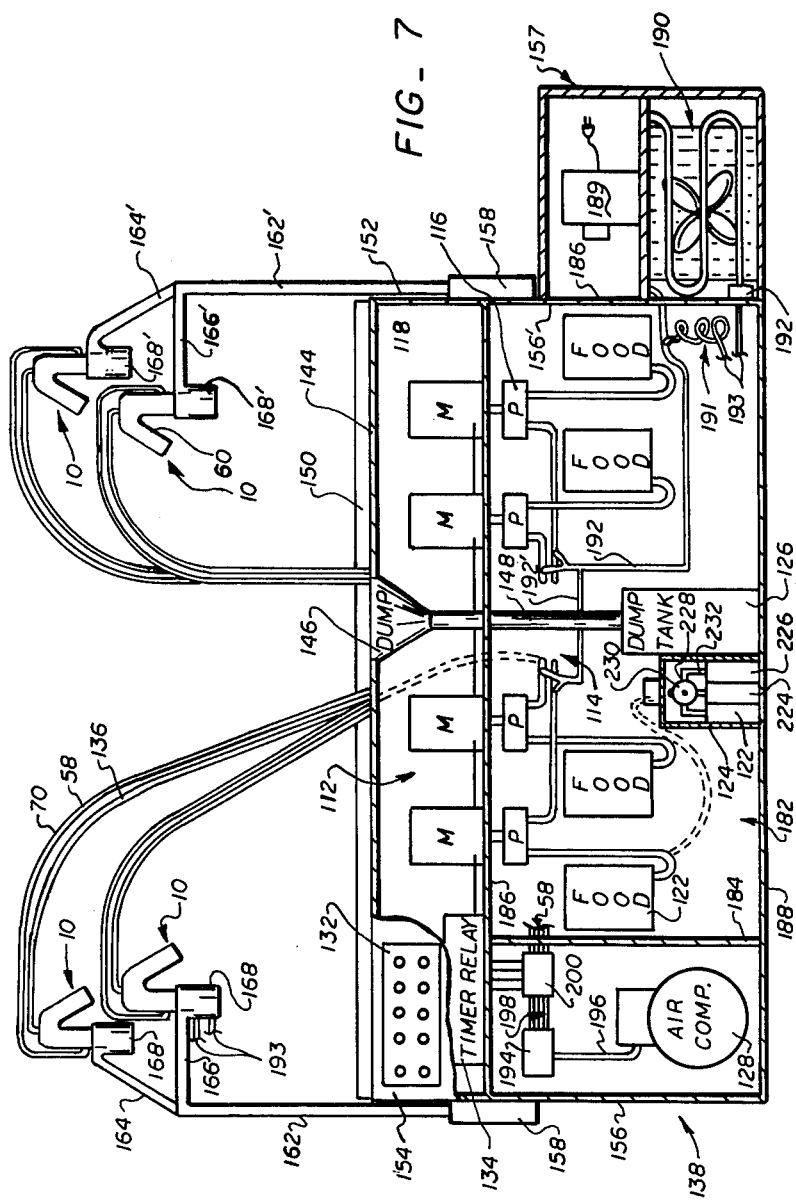

4,477,003

CONDIMENT DISPENSING SYSTEM

BACKGROUND OF THE INVENTION

1. Field of the Invention

The present invention relates generally to dispensing systems, and more particularly to dispensing systems suitable for use in the fast-food industry for applying to foodstuffs premeasured quantities of condiments, and the like.

2. Description of the Prior Art

A problem is faced in the fast-food industry of uniformly applying condiments such as ketchup, mustard, relish, hot sauce, mayonnaise, and the like, to various dishes such as hamburgers, hotdogs, tacos, and the like. A usual manner is to have these condiments applied to various foodstuffs by an operator using a plastic squeeze bottle, and the like, which can result in a great lack of uniformity in application due to such factors as the amount of condiment in the squeeze container, the hand strength of the operator, and the experience and attentiveness of the operator. Such lack of uniformity is undesirable in the fast-food restaurant industry, inasmuch as individual restaurant chains in this industry seek separate identity by a distinct taste of its foods which is different from similar foods of its competitors. Accordingly, there is a need to dispense premeasured amounts of various condiments on foods in a manner which is independent of the physical and mental state of a particular operator.

Further, there is a problem with keeping condiments sitting about for substantial periods of time without refrigeration.

Devices have been proposed for dispensing condiments, and the like, in a uniform manner as discussed above. For example, U.S. Pat. Nos. 4,032,044, issued June 28, 1977, to J. B. Flynn, et al., and 4,124,147, issued Nov. 7, 1978, to W. K. Priece, disclose dispensing systems which permit storage of at least one condiment at a food storing station remotely located from a station where condiment is applied through a dispensing gun. The latter in each instance employs a metering chamber defined partially by flexible diaphragms. The quantity of condiment dispensed is a predetermined amount for each serving.

Further, U.S. Pat. No. 3,203,595, issued Aug. 31, 1965, to M. J. Berkowitz, discloses a dispensing system for condiments in which pneumatic pressure is employed for carrying out the dispensing function. A controlled quantity of condiment is dispensed per serving, with the metering being performed by a solenoid operated dispensing valve which is opened for a predetermined period of time under the control of a time delay circuit. The valve has connected thereto a food tube and air hose. In a structurally similar manner, U.S. Pat. No. 3,963,061, issued June 15, 1976, to J. W. Kenney, discloses an apparatus for drawing liquids into and expelling same from a pipette. An air metering groove is employed without the use of a piston, with separate buttons being actuated for the drawing of liquid into the metering groove and for the expelling of liquid from same. The above operations are carried out by use of pneumatic pressure.

Additional examples of air-operated dispensing guns can be found in U.S. Pat. Nos., 1,965,038, issued July 3, 1934, to G. H. Hartman; 2,941,726, issued June 21, 1960, to H. Szczepanski; 3,198,439, issued Aug. 3, 1965, to J. H. McNinch, Jr., et al.; and 3,830,410, issued Aug. 20, 1974, to J. M. Magrath, et al. Finally, U.S. Pat. No. 4,006,847, issued Feb. 8, 1977, to D. W. Dooley, discloses a dispensing apparatus including a block housing in which is disposed at right angles to one another a dispensing cylinder and a three-way spool valve operable for controlling a dispensing piston located in the aforementioned dispensing cylinder.

SUMMARY OF THE PRESENT INVENTION

It is an object of the present invention to provide a dispensing system capable of applying predetermined amounts of condiments, and the like, in a simple yet efficient manner.

It is another object of the present invention to provide a condiment dispensing system in which a predetermined quantity of condiment being dispensed is fed into a dispensing gun of the apparatus immediately following application of the quantity of condiment previously fed into the gun.

Still another object of the present invention is to provide condiment dispensing apparatus wherein the condiment is kept refrigerated at all times in the system prior to being applied to a foodstuff.

Yet another object of the present invention is to provide a condiment dispensing apparatus which can be cleaned in a simple and convenient manner.

These and other objects are achieved according to the present invention by providing apparatus for dispensing condiments, and the like, which comprises a gun assembly arrangeable for dispensing a measured amount of a condiment and connected to a pump assembly itself connectable to a supply of a condiment for selectively feeding a measured amount of the condiment from the supply thereof to the gun assembly. A fluid flow arrangement is associated with the gun and pump assemblies for placing same in communication with one another and with the supply of condiment. The gun includes a trigger device arranged for transmitting a signal through the flow arrangement to actuate the pump assembly and feeding measured amount of a condiment from a supply thereof only when the trigger is released following the dispensing of a previously measured amount of condiment. A suitable cabinet structure is provided for housing the pump assembly, a compressor for dispensing a premeasured amount of a condiment from the dispensing gun, and a control system for intermittently actuating the pump assembly and compressor. A portion of the cabinet structure is refrigerated so as to form a cold storage compartment for receiving at least one conventional container of a condiment, with the number of containers depending on the number of dispensing guns used with a particular dispensing apparatus. In addition, the part of the fluid flow arrangement carrying the condiment or other perishable substance from the refrigerated area to the dispensing guns is likewise refrigerated. A cleaning device is also disposed within the cabinet structure, preferably in the refrigerated portion thereof, for permitting selective disconnection of the fluid flow arrangement from a condiment container so that the flow arrangement can be cleaned by circulation with cleaning fluid therethrough.

It is an advantage of the present invention that a condiment or other perishable substance is kept under refrigeration at all times it remains in the system.

It is another advantage of the present invention that only comparatively low pressure need be applied to the system for a very small increment of time.

Still another advantage of the present invention is that the apparatus can be conveniently cleaned as necessary in a simple, yet efficient, manner.

These and other objects and advantages of the present invention will no doubt become apparent to those of ordinary skill in the art after having read the following detailed description of the preferred embodiments which are illustrated in the several figures of the drawing.

IN THE DRAWINGS

FIG. 3 is a perspective view showing a dispensing holster according to the present invention;

FIG. 4 is a partially diagrammatic, fragmentary, perspective view showing a dispensing gun for use with apparatus according to the present invention;

FIG. 5 is a fragmentary, partially diagrammatic, sectional view taken generally along the line 5—5 of FIG. 4;

FIG. 6 is an enlarged, sectional view taken generally along the line 6—6 of FIG. 4;

FIG. 7 is an enlarged, diagrammatic, sectional view taken generally along the lines 7—7 of FIG. 2.

DETAILED DESCRIPTION OF THE PREFERRED EMBODIMENTS

Figure 1:
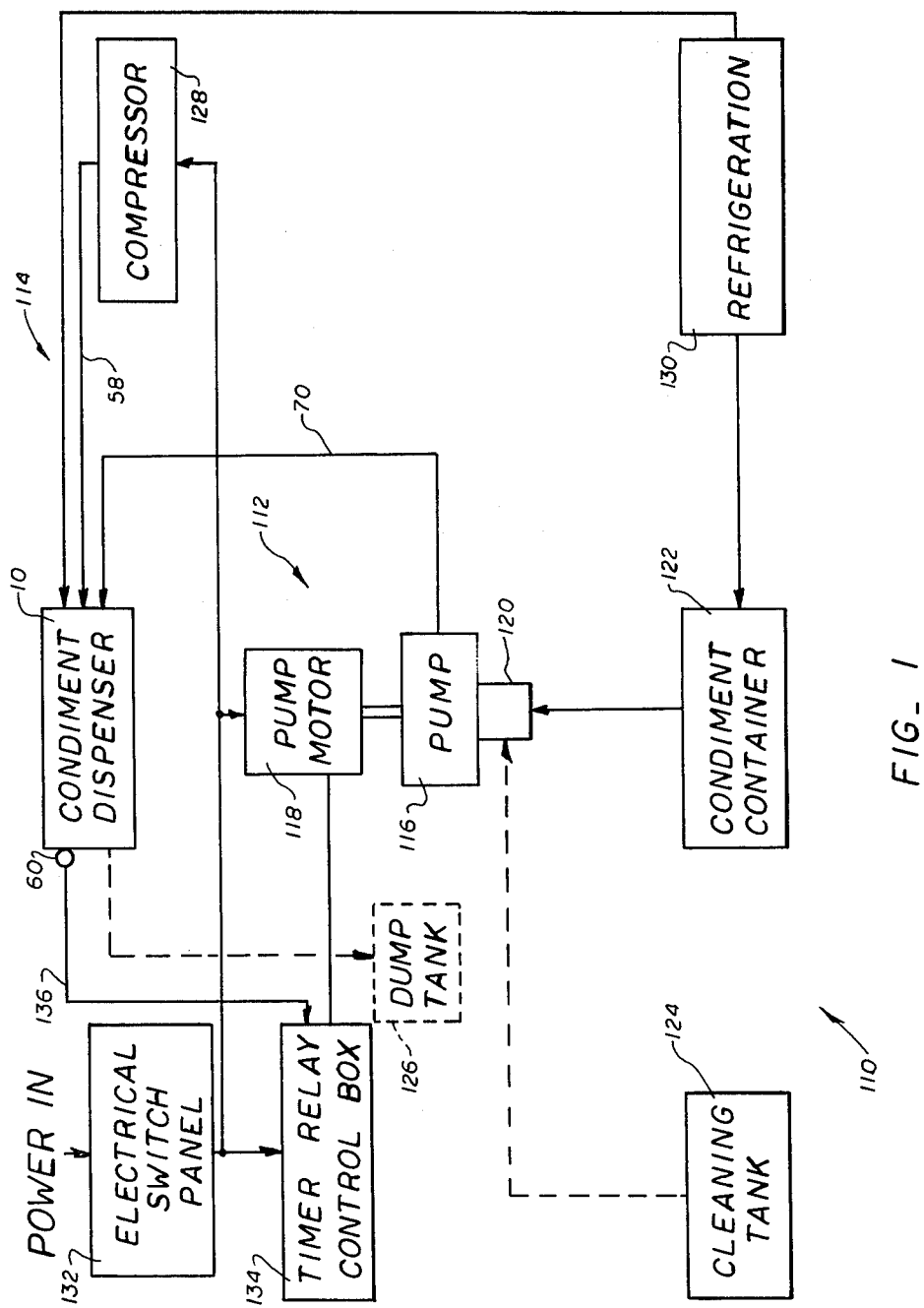
FIG. 1 is a flow chart showing a condiment dispensing system according to the present invention.

Referring now more particularly, to FIG. 1 of the drawings, an apparatus 110 according to the present invention for dispensing condiments, and the like, comprises a gun 10 arrangeable for dispensing a measured amount of such condiment and having connected thereto a pump assembly 112 connectable to a supply of a condiment to be dispensed for selectively feeding a measured amount of the condiment from the supply thereof to gun 10. A flow arrangement 114 including a food conduit 70 is associated with gun 10 and pump assembly 112 for placing same in communication with one another and with the supply condiment.

Assembly 112 includes a pump 116 having connected thereto a motor 118 for driving same. Pump 116 and motor 118 advantageously are formed in a single unit, and preferably are in the form of a conventional tubing pump system such as those marketed by the "Barnant Corporation" and disclosed in U.S. Pat. No. 3,358,069. This kind of pump works on a peristaltic principal in which rotary action is converted into positive displacement pumping. More specifically, such a pump has a length of flexible tubing which is acted upon by rollers arranged equal distance around the periphery of a rotor so as to sequentially suppress and release the length of tubing when same is wrapped around the rotor. In this manner, it is possible to insert the length of tubing partially forming the pump into flow arrangement 114 so as to keep the condiment or other substance being transported at all times within a line constructed from a material which meets appropriate regulations for handling foodstuffs. A conventional thermoplastic polycarbonate resin has been found satisfactory for the purpose of forming the lines in flow arrangement 114.

A connector system 120 is releasably attachable to gun 10 and to a container 122 of condiments or other foodstuffs to be dispensed by apparatus 110. Alternatively, connector system 120 is removed from a container 122 and attached to a cleaning tank 124 for periodic cleaning of flow arrangement 114 in a manner to be described below.

A dump tank 126 is used in the cleaning process referred to immediately above, and the function thereof will also be made clear below.

Flow arrangement 114 includes a compressor 128 arranged for supplying an operating medium for gun 10 through a conduit 58. While any suitable, known compressor can be used, a Model No. 707-FE50 manufactured by Thomas Industries has been found satisfactory for use with an apparatus 110. Also included in apparatus 110 is a refrigeration unit 130 and associated coils permitting cooling of a condiment, and the like, throughout the dispensing system.

An electrical switch panel 132 is operably connected to a timer relay control device 134 itself in communication as by a hose 136 with a trigger 60 of gun 10 for selectively actuating motor 118 in response to a signal transmitted through hose 136 and indicative of trigger 60 being released following actuation thereof to dispense a quantity of a condiment, and the like, in order to feed to gun 10 a measured amount of the condiment from container 122.

In operation, when it is desired to dispense the contents of a loaded gun 10 onto appropriate foodstuffs (not shown), trigger 60 of gun 10 is depressed so as to positively eject the condiment from gun 10 in a manner to be described below. Once trigger 60 is released, however, timer relay control box 134 is actuated by a signal transmitted through hose 136 so as to actuate pump motor 118 and cause pump 116 to feed a predetermined quantity of condiment from a container 122 to gun 10 for reloading same. It has been found that a maximum pump pressure of only 40 psi during operation of pump 116 for a period of time of, for example, four seconds is sufficient to reload gun 10. Accordingly, there is no pressure in the food conduit 70 except for a relatively short increment of time. Compressor 128 is used to actuate gun 10 in a manner to be described below when trigger 60 is actuated.

When it is desired to clean flow arrangement 114, parts gun 10 itself being removable and washable in a conventional manner, gun 10, or at least the lines attached thereto, are manually moved to dump tank 126. Pump motor 118 is manually turned in a conventional manner so as to run in reverse. Now, with gun 10 advantageously held over dump tank 126, trigger 60 of gun 10 can be held in an actuated mode. Timer relay control device 134 can be manually overridden so as to cause any condiment in gun 10 and flow arrangement 114 to be purged back into container 122. This cycle may require 10 to 15 seconds, for example. Now, pump motor 118 can be turned to off and trigger 60 released and connector system 120 used to disconnect flow arrangement 114 from container 112 and attach same to cleaning tank 124. Gun 10 is again held over the dump tank 126 and trigger 60 held in actuated mode. With pump 116 running in its forward direction, one or more cleansing solutions can be run through flow arrangement 114, and gun 10, until the tubing of flow arrangement 114 is physically clean. While still retaining trigger 60 in actuated mode, pump 116 can be turned to run in reverse, so as to purge all the cleansing solution from the system. The apparatus can now be deactuated until ready for startup.

Figure 2:
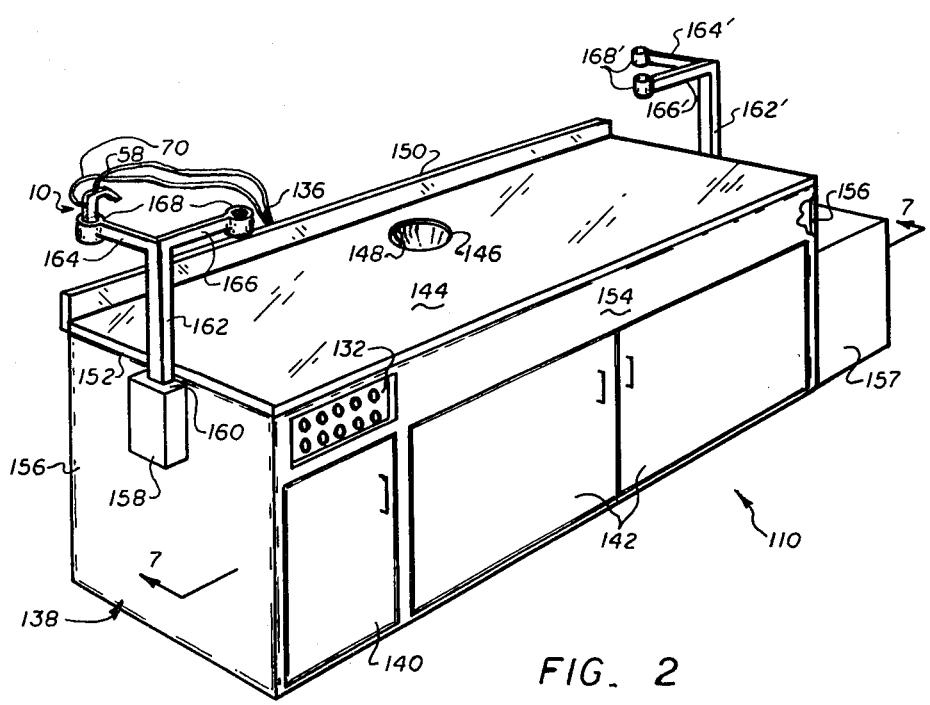
FIG. 2 is a schematic, front perspective view showing apparatus embodying a condiment dispensing system according to the present invention.

Referring now more particularly to FIG. 2 of the drawings, apparatus 110 advantageously is housed in a cabinet 138 provided with closure such as the doors designated 140 and 142 and having a substantially planar top 144 into which is formed an entrance funnel 146 leading to a pipe 148 extending downwardly into the interior of cabinet 138 to dump tank 126 (FIG. 6). Along the rear edge of top 144, that being the edge spaced laterally from the surface in which doors 140 and 142 are provided, is a ledge 150 arranged forming a barrier which prevents accidental spillage from top 144 over the back of cabinet 138. Top 144 is bounded by a rim 152 which fits down over the front wall 154 and sidewalls 156 and 156' partially defining cabinet 138 in order to hold top 144 in place. Advantageously, cabinet 138 also has a back wall, not shown. Refrigeration unit 130 is housed partially in an enclosure 157 disposed adjacent wall 156 of cabinet 138. Mounted on each of the sidewalls 156 and 156' of cabinet 138 is a respective bracket 158 and 158' each provided with a well 160 which is illustrated as being of generally rectangular configuration but can be of any appropriate section and in which is received the bottom or base end of a respective column 162 and 162' each of which terminates at the upper or top end thereof in divergent arms 164, 166 and 164', 166', respectively. It is to be understood that the arms 164, 164' and 166, 166' are affixed to a respective column 162, 162' in an appropriate manner, with the arms 164, 164' being shown as rigid extensions of the respective column 162, 162'. Each of the arms 164, 164' and 166, 166' terminates in a holster 168 and 168', respectively, illustrated is in the form of the cup-like holder arranged for receiving a respective dispensing gun 10. As illustrated in FIG. 2, apparatus 110 is set up to receive as many as four guns 10, although one gun 10 is shown therein.

FIG. 3 shows a holster 168, 168' in greater detail. As can be seen, each holster 168, 168' has double walls 169, 169' forming between them a chamber which receives in a manner to be described below a refrigerant for refrigeration unit 130.

Referring now to FIGS. 4 and 5 of the drawings, construction of a gun 10 according to the present invention will be described.

Gun 10, which can be constructed from any suitable, known material, includes a housing made in two pieces 12 and 14 joined together in a suitable known manner.

With a few minor exceptions, pieces 12 and 14 are mirror images of each other. Accordingly, only housing piece 12 will be described, with it being understood that the internal parts set forth in conjunction with the description of piece 12 merely fit into piece 14 when the pieces are overlying one another.

Housing piece 12 has a barrel section 12a, a handle section 12b, and a connecting section 12c. At the discharge end of the gun, section 12a is generally rectilinear in cross section as seen in FIG. 4. Ribs 17 and 18, which are integrally formed with the housing piece 12 and extend transversely thereof, have semicylindrical recesses 17a and 18a, respectively. Recess 17a receives a piston rod 19 of a linear fluid motor 20, while recess 18a receives an end of cylindrical motor 20 from which rod 19 extends. Motor 20 is retained in a cavity formed in housing piece 12 between terminating wall portions 21a and 21b by additional ribs 22 and 23 similar to ribs 17 and 18 and provided with semicylindrical recesses which receive a cylindrical barrel portion of motor 20.

In handle section 12b of gun 10, as well as in the connecting section 12c, piece 12 has curved wall portions 25a and 25b connected by a web straight section 25c. Intermediate the length of handle section 12b, the walls 25a and 25b are reinforced by wall portions 25d and 25e, respectively, and with walls 25a, 25d, and 25e being provided with semicylindrical recesses 26a and 26e, respectively, arranged for receiving cylindrical portions of a conventional fluid valve assembly 28.

Attachment of pieces 12 and 14 to one another can be achieved by use of conventional screw fasteners not shown and the like which are insertable through corresponding holes in the housing piece 12 and 14 to lock together the two-housing pieces 12, 14. Similarly, locating pins and holes (not shown) can assist positioning 16 of the pieces 12 and 14.

At an outer end of barrel section 12a of gun 10, housing piece 12 has a reduced diameter portion 42 which forms a shoulder 42a. A cylindrical opening 44 extends entirely through the housing piece 12, with a tubular portion 45a of an elbow connection 45 being disposed in opening 44 and retained there at as by a suitable, known adhesive.

A cylindrical metering chamber 46, of which elbows 45 is an extension is removably arrangeable in housing piece 12 between shoulder 42a and rib 17. Chamber 45 can be constructed from stainless steel, and the like, to meet health regulations and to facilitate cleaning when removed as through a removable cover 14a provided in housing piece 14. This cover 14a can be retained in a conventional manner, not shown. A cylindrical piston 47 is secured to the end of piston rod 19 spaced from the cylindrical barrel of motor 20 so as to reciprocate in the chamber formed between shoulder 42a and the lower end of an annular spacer member 49, which can be a resilient bushing, disposed in the chamber 46 between piston 47 and rib 17. A rubber O-ring 50, for example, is disposed in a peripheral groove formed in the circumference of piston 47 so as to provide a seal between piston 47 and the inner wall of the chamber 46.

Fluid motor 20 is a conventional double-acting motor having a piston 52, and is supplied with a suitable fluid, such as air, under pressure through a flexible tubular conduit 55 at one end and at the other end thereof by a conduit 56. The conduits 55 and 56 are connected into opposite ends, or outlet ports, of a block of the valve 28, while a supply conduit 57 is connected to a central section, or inlet ports of the valve 28. The supply conduit 57 extends through the wall of the connecting section 12c of housing piece 12 and communicates with a conduit 58 leading to compressor 28 (FIGS. 1 and 6) so as to receive a supply of fluid under pressure.

Valve 28 has a valve element (not shown) that is slideable longitudinally by trigger 60 in the block of valve 28. When the valve element is moved in one direction as by depressing trigger 60 toward handle section 25b, flow will be established between conduits 55 and 57. Simultaneously, conduit 56 will be vented to atmosphere in a conventional manner not shown. This will cause piston 47 to be moved toward the discharge or lower end of barrel section 12a of gun 10 to force material disposed in the chamber forming the lower end of barrel section 12a out of gun 10. When trigger 60 is released by an operator (not shown), an internal valve spring (not shown), and the like, moves trigger 60 away from handle section 12b and shifts the valve element longitudinally to a position where the conduit 57 is in flow communication with conduit 56 and conduit 55 is vented to atmosphere. When fluid under pressure enters the end of motor 20 in communication with conduit 56, piston 47 will be moved upwardly until its movement is stopped by the presence of the spacer tube 49.

Once a condiment, such as ketchup, mustard, relish, and the like, is delivered to the chamber formed in the lower end of section 12a by a conduit 70 extending from pump 116 and connected to elbow 45 as by a suitable common known quick-disconnect coupling 73 (FIG. 4). Supply conduit 70 extends through support loops (not shown) formed on the housing of gun 10.

Gun 10 can be assembled by inserting an assembly of valve 28 and motor 20 connected together by conduits 55, 56, and 57 into housing piece 12 together with spacer member 49 so that these members rest in their assigned recesses. The conduit 58 is then connected to a rotatable, two path, quick disconnect, pass-through fitting 64 disposed in a recess formed the wall of connector piece 12c of housing piece 12, together with hose 136 which is inserted into conduit 56 as by a tap 170 of conventional construction and by a length of hose 137. Housing piece 14 is then placed over lying piece 12, and bolts (not shown) and the like inserted through the aligned holes in the pieces 12, 14 so as to secure together same. It will be appreciated that housing piece 14, being substantially a mirror image of housing piece 12, will contain complimentary ribs similar to rib 17, 18, 22, and 23 for holding in their proper locations the various members disposed within gun 10.

It also will be noted that when the housing pieces 12 and 14 are secured together, the dispensing chamber 46 at the lower end of barrel section 12a, which is the only part of the gun 10 that receives a condiment or other substance to be dispensed, is firmly held in place.

Provided on the lower end of reduced diameter portion 42 of the barrel section 12a is a flange 42b having a plurality of cutout portions 42c arranged forming a part of a twist-lock system of a conventional nature.

Removably attached to flange 42b is a positive acting discharge valve 510 comprising a valve housing 512 in which is slideably disposed a valve element 514 having a pair of spaced piston-like parts 516 and 518 each provided with a respective annular seal ring 520, 522, and connected by a rod 524. Extending transversely of a chamber formed within housing 512 in which element 514 is slideable is an inlet port 526 and an outlet port 528. As illustrated, valve 510 is in an open, or discharge mode, since the gap between element parts 516 and 518 is in alignment with ports 526 and 528. A conventional coiled compression spring 530, and the like, biases element 514 toward the left in FIG. 5. Terminating the right hand end of housing 512 is a flange 532 provided with cutouts 534, in a manner similar to flange 42b and cutouts 42c, and arranged for removably receiving a cap 536 having a flange 538 provided with tabs 540 engageable in cutouts 534 for retaining cap 536 on flange 532 in a conventional manner by a twisting motion.

The left end of housing 512 is provided with a passage 542 connectable to a source of fluid under pressure in a manner to be described below in order to selectively move element 514 against the bias of spring 530 from a normally closed mode (not shown) to the open mode illustrated in FIG. 5.

Forming an upper surface of housing 512 is an annular flange 544 provided with table 546 engageable with cutout portion 42c of flange 42b for removably locking housing 512 to the lower end of barrel section 12a by a twisting movement similar to that for attacking cap 536 discussed above, while permitting easy removal of valve 510 for cleaning a connection annular seal ring 548 advantageously is deposed between housing 512 and the lower end of chamber 45 to assure a good seal between same, an annular groove formed in housing 512 for seating ring 548.

When housing 512 is mounted on section 12a as illustrated, it will be seen that the outlet of passage 542 from housing 512 is in alignment with a lower end of a fluid duct 550 formed on the inner portion of section 12a and in communication at an upper end with a line 552 branched from conduit 55 as by a Tee 554 so as to pass a fluid under pressure to passage 542 whenever valve 28 is passing the fluid to conduit 55, and the upper end of motor 20.

A piece 556 of a suitable, known sealing material can be arranged about the outlet of passage 542 to prevent leakage of the operating fluid at this point.

A discharge nozzle 65 is shown in FIG. 5 as attached to an annular rim 558 disposed on the lower surface of housing 512, which nozzle 65 preferably being constructed from a suitable, known resilient material so as to snap over rim 558, and having a through bore 560 arranged in alignment with outlet port 528 of housing 512.

A defuser cap (not shown), which can be constructed from a yieldable material, can have a snap-on connection with the lower end of the discharge valve housing in place of a nozzle. This cap can have a relatively thin, central, slightly conical wall that comes to an apex and is provided with, for example, four cuts extending through the wall so as to intersect at the apex in order to provide in the illustrated example four flaps which will yield to permit the substance being dispensed to be moved through the cap under the urging of piston 47.

As mentioned above, the housing pieces 12 and 14 are substantially identical mirror images of one another. The differences can be easily seen by reference to FIGS. 5 and 6. In general, piece 14 is identical to piece 12 and fits over the motor and chamber 46. Piece 14 may not have as large an opening as piece 12 for receiving the sitting 64.

In operation, when piston 47 is moved away from the discharge end of gun 10, condiment enters and fills the chamber disposed in front of piston 47 It will be evident that the size of the charge of condiment in the chamber depends on how far the piston is retracted, and this depends upon the length of the spacer member 49. Since member 49 is replaceable, gun 10 can be quickly and easily adapted for discharging different size charges. For example, a set of members can be provided so that charges of condiment arranging from one third of an ounce to one ounce can be made.

With this gun, an operator will know exactly how much material is going to be discharged, and can then concentrate efforts on distributing the material in an appropriate pattern on the food he is processing. At the end of a shift, or at any other time, as one that is necessary to change a type of condiment being dispensed by a specific gun 10, a gun 10 can be cleaned and sanitized merely by disconnecting conduits 58 and 70 and hose 136 and washing gun 10 in a conventional manner. Alternatively, gun 10 can be retained on conduits 58 and 70 and hose 136 and cleaned by running cleaning fluids through conduit 70 in a manner described above after chamber 46 has been removed through cover 14a.

FIG. 6 shows a cross section of conduit 70 wherein it can be seen that in addition to a bore 174 running essentially through the conduit for carrying a supply of condiments or other substance to be dispensed, there are a pair of passages 176 and 178 extending substantially parallel to bore 174 and to one another and provided with a connector portion 180 adjacent coupling 73 for permitting a refrigerant (not shown) to be circulated in conduit 70 right up to the aforementioned coupling 73. In this manner, since the passages 176 and 178 extend from the vicinity of an associated pump 116 the substance being dispensed can be kept under refrigeration right up to barrel section 12a of an associated gun 10.

FIG. 7 of the drawing illustrates the arrangement of the component parts described above within and above cabinet 138. In particular, within the hollow interior of cabinet 138 are provided thermally insulated double walls 184 and 186 which cooperate with a portion of a bottom 188 of cabinet 138 and with a portion of sidewall 156′ thereof also being thermally insulated double wall portions to form a refrigerated compartment within cabinet 138.

Refrigeration unit 130 is of conventional construction and includes a motor/compressor assembly 189 arranged in enclosure 157 together with a condenser 190. Disposed in the refrigerated compartment of cabinet 138 is an evaporator coil 191 connected between motor/compressor assembly 189 and condenser 190, while an expansion valve 192 is inserted between coil 191 and condenser suitable control device not shown, can be provided as desired to control operation of unit 130. Essentially, the latter is a conventional refrigerator system with parts rearranged as necessary to fit onto cabinet 138.

Extending from evaporator coils 191 of refrigeration unit 130 are two path lines 192, 192′ suitably connected in a conventional manner to conduit 70 each associated with a respective gun 10 so as to be in communication with the respective passages 176 and 178 and circulating a refrigerant through connector portion 180 to cool an associated conduit 70. Extending from coil 191 of refrigeration unit 130 are lines 193 associated holster 168, 168′ for cooling same, with only one connection being shown as typical by flow through the chamber formed by walls 169, 169′. In this manner, a gun 10 disposed in a holster 168, 168′ when not in use will have the condiment disposed therein retained under refrigeration until such time as it is decided to dispense such condiment.

As can be seen, cabinet 138 houses four pumps 116 and associated motors 118, one for each gun 10, with a respective food container 122 for each pump 116.

Air compressor 128 is disposed within cabinet 138 preferably outside of the refrigerator compartment described above and is connected to a manifold 194 as by a line 196. The output of the aforementioned manifold 194 is a plurality of lines 198, one for each of the guns 10 employed in a specific system, four as illustrated, to a timer relay manifold 200 connected to timer relay control box 134 and having as an output a conduit 58 for each of the guns 10 in the system. As will be described below, manifold 200 will permit air flow from compressor 128, and manifold 194, to a specific conduit 58 only when the trigger 60 of the gun 10 associated with that conduit 58 is actuated by depressing same.

The electrical switch panel 132 and timer relay control device 134 will now be described in greater detail with reference to FIG. 7 of the drawings.

Figure 8:
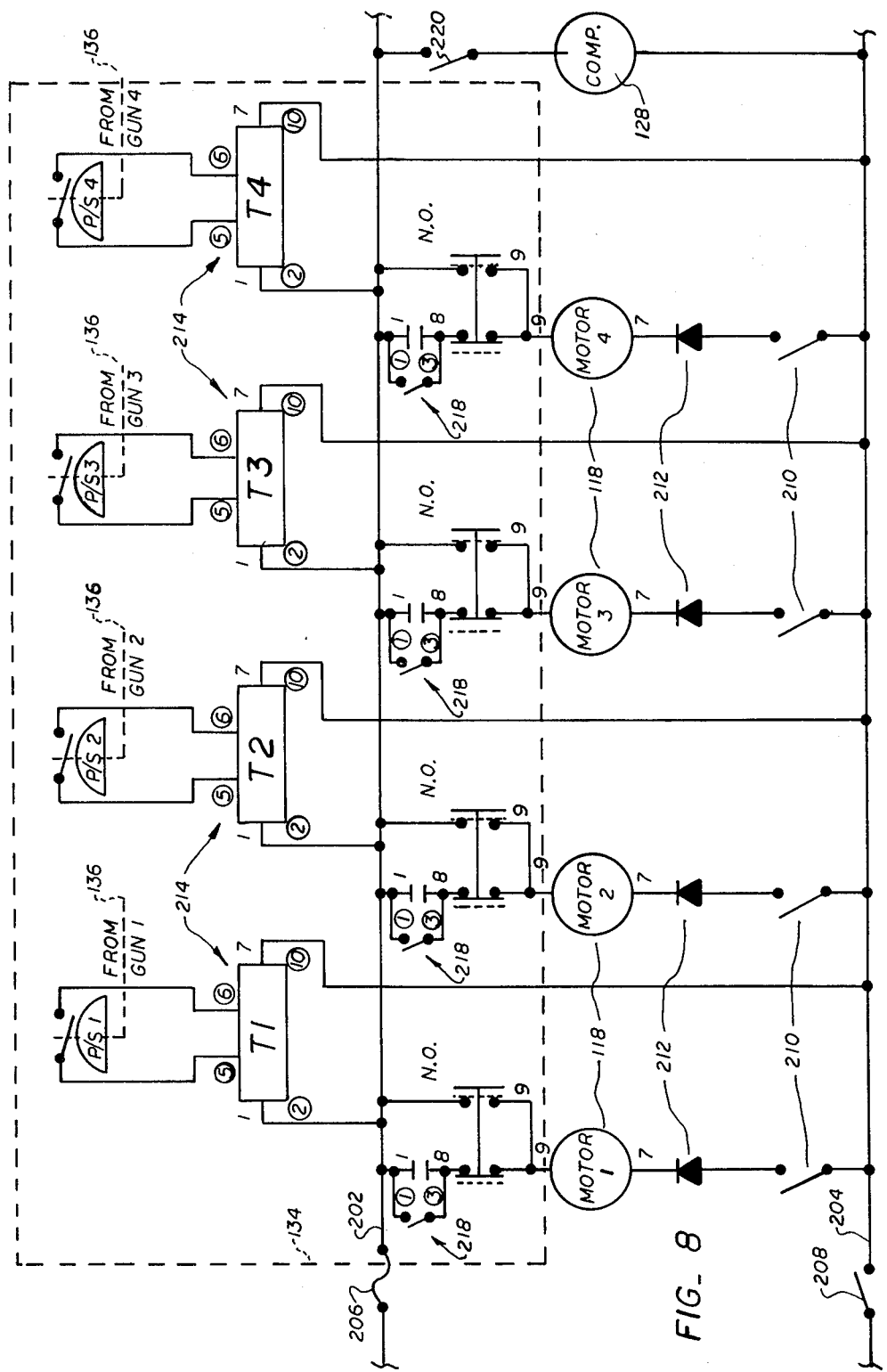
FIG. 8 is a schematic diagram showing an electrical control system for use with apparatus according to the present invention.

In the schematic shown in FIG. 8, incoming power is represented by parallel wires 202 and 204, with a conventional fuse 206 being disposed in wire 202 and a conventional electrical power master switch 208 being illustrated as inserted in wire 204. The pump motors 118, with four such being illustrated to conform to FIG. 7, are shown as arranged in parallel between wires 202 and 204, with a conventional single pole-single throw (S.P.S.T.) pump switch 210, mounted on switch panel 132, being disposed in the circuit for each of the motors 118. Also inserted in the circuit for each of the motors 118, and arranged between such motor and associated switch 210, is a conventional diode 212 arranged for functioning as a rectifier in order to convert incoming AC voltage to 12 volt DC voltage which pulses an associated motor 118 at for example, 60 times per minute, for example. While the parameters for a motor may vary in dependence upon a specific dispensing system, it is contemplated that the motors 118 will rotate at approximately 500 rpm. Inserted into each motor circuit between an associated motor 118 and wire 202 are the contacts for timers 214. It will be appreciated that there will be one timer 214 for each motor 118, and the contacts of each timer 214 are associated with a coil portion selectively energized by an associated pressure sensitive switch 216 partially forming relay control device 134. As can be seen from FIG. 7, the latter are connected to an associated signal hose 136 so as to energize the coil when of an associated timer 214 whenever a pressure signal is received from an associated gun 10 as described above and cause motor 118 associated with a specific switch 216 and timer 214 to run for a few seconds in order to feed condiment to the associated gun 10 and reload same. When the selected time interval is finished, the circuit for the specific motor 118 will shut down until reset by reduction of pressure in line 136.

A bypass switch 218, which may be a conventional S.P.S.T. switch, is disposed around the normally open contact of an associated timer 214 in order to permit motor 118 to be run continuously as when cleaning flow arrangement 114. Further, a suitable S.P.S.T. switch 220 is advantageously placed in series with compressor 128, which is also arranged across wires 202 and 204, in order to manually start and stop operation of compressor 128.

Referring again to FIG. 7, it will be seen that cleaning tank 124 comprises three compartments 220, 224, and 226 in the illustrated embodiment. These compartments are placed in communication with the inlets of a three-way valve 228 having an outlet provided with a suitable, known fitting partially forming connector 120 and compatible with the fitting, also partially forming connector 120, on each of the hoses extending from an associated pump 116 and normally connected to a conventional food container 122 disposed in the refrigerated compartment of cabinet 138. As illustrated, it is intended to manually switch valve 228 between the three inlets by an element the shaft 230 of which has illustrated, but what is to be understood that a suitable electrically actuated switch (not shown) and the like can be employed if desired for cycling cleaning tank 126. In this manner, compartment 222 can contain, for example, a grease cutting washing solution known per se, compartment 224 can contain a cleansing solution such as iodine, and compartment 226 can contain a rinsing hot water solution, and the like, and these solutions can be sequentially passed through flow arrangement 114 in the manner described above when cleaning the system. The pump 116 associated with a line connected to outlet 230 of cleaning tank 126 forcing the solutions through the system by closing the bypass switch 218 associated with the associated pump 118 as described above in conjunction with FIG. 8.

As can be readily understood from the above description and from the drawings, condiment dispensing apparatus according to the present invention permits an operator to dispense a premeasured amount of a condiment, and the like, while concentrating only on the area where the substance is being applied. Thus, no experience or specific skill is required. Further, the condiment or other foodstuffs being dispensed is kept refrigerated at all times until it is actually applied as desired. Most importantly, except for very short applications of a pressure up to 40 psi in the system, the lines forming the food dispensing portion of the device itself are essentially pressure free. Finally, cleaning of the system to comply with applicable regulations can be accomplished in a simple manner, with it being possible to recover virtually all of the condiment and keep waste at in extremely low levels.

Whereas the preferred embodiments of the present invention has been described above, it is contemplated that other alterations and modifications may become apparent to those skilled in the art after having read the above disclosure. It is therefore intended that the appended claims be interpreted as covering all such alterations and modifications as fall within the true spirit and scope of the invention.

We claim:

1. Apparatus for dispensing condiments, and the like, comprising, in combination:
   (a) gun means arrangeable for dispensing a measured quantity of substance, including in combination,
      (1) a housing having a first portion defining a chamber for receiving said measured quantity,
      (2) motor means mounted in a second portion of said housing and having a piston and a rod affixed to the piston, the piston and the rod being slideably disposed in said chamber, and a fluid motor attached to the rod and arranged for selectively reciprocating the rod and the piston for selectively discharging said measured quantity from said chamber, and
      (3) trigger means connected to said motor means for selectively actuating said motor means for reciprocating the rod and the piston disposed in said chamber which selectively causes discharge of said measured quantity from said chamber;
   (b) pump means connected to said gun means and connectable to a supply of a substance for selectively feeding to said gun means said measured quantity from the supply thereof including at least one pump and a pump motor connected to the pump for driving same, and time relay control means arranged for communication with said gun means and connected to the pump, responding to a signal indicative of said trigger means being released from a dispensing mode;
   (c) flow means connected to said chamber by a discharge opening and said pump means, placing said gun means and pump means in communication with one another and with said supply, the flow means arranged for transmitting the signal from said gun means, actuating said pump means, and feeding said gun means said measured quantity from said supply only when said trigger means is released from the dispensing mode, and includes connector means for releasable attachment to a container of said supply, and cleaning means to which said connector means is attachable alternately with attachment to the container of said supply of substance for periodically cleaning said flow means.

2. Apparatus as defined in claim 1, wherein said timer relay control means comprises a pressure sensitive switch connected to a source of energy and to said motor connected to said pump, and said flow means including a hose connected to said gun means and to said pressure sensitive switch of said timer relay control means for actuating said switch as a function of pressure in said gun means.

3. Apparatus as defined in claim 1, wherein said apparatus further includes a cabinet, said pump means disposed within said cabinet, and a portion of said cabinet being refrigerated, said portion being refrigerated is thermally insulated, and further includes refrigeration means comprising a refrigeration unit providing a flow of a refrigerant into said portion being refrigerated, lines carrying the refrigerant and arranged extending from said portion being refrigerated to said gun means, said flow means further including,
   a conduit releasably connected to the container of said supply, connected to said pump means and said gun means for permitting periodic cleaning of said flow means, said line releasably connected to the container including flow paths for the refrigerant to the gun means and return to said refrigeration unit, and
   holster means for supporting said gun means when said gun means is not in use, said holster means comprising a holder arranged forming a receptacle for retainably receiving a portion of said gun means, said holster means including spaced double walls forming a refrigerant chamber, and said lines carrying the refrigerant being connected to said holster means for passing the refrigerant through the refrigerant chamber.

4. Apparatus as defined in claim 3, wherein said motor means includes a piston, a rod affixed to said piston, said piston and said rod being slideably disposed in the chamber of said housing, and a fluid motor attached to said rod and arranged for selectively reciprocating same, and said piston, in response to movement of said trigger means to a dispensing mode.

5. Apparatus as defined in claim 4, wherein said fluid motor is a double-acting fluid motor having a pair of spaced ends, and said trigger means comprises a valve having a block, a valve element movably disposed in said block, an inlet port, and two outlet ports, one of said outlet ports being connected to a one of said ends of said fluid motor, and the other of said outlet ports being connected to the other of said ends of said fluid motor, said valve element alternately venting a one of said outlet ports and connecting said inlet port to the other of said outlet ports, said inlet port being connected to a source of fluid under pressure, connection of one of said ends of said motor to the fluid under pressure moving said piston toward the discharge opening of said housing, the other of said outlet ports being connected to said pump means for generating a signal when the other of said outlet ports is vented.

6. Apparatus for dispensing a measured amount of a substance, comprising, in combination:
  (a) a housing defining a chamber and having a discharge opening communicating with the chamber;
  (b) double acting fluid motor means disposed in said housing for selectively causing a measured quantity of substance in said chamber to be discharged through said discharge opening, said fluid motor having a pair of spaced ends, and said trigger means having a valve having a block, a valve element moveably disposed in said block, an inlet port, and two outlet ports, one of said outlet ports being connected to a one of said ends of said fluid motor, and the other of said outlet ports being connected to the other of said ends of said fluid motor, said valve element alternately venting a one of said outlet ports and connecting said inlet port to the other of said oulet ports, said inlet port being connected to a source of fluid under pressure, connection of one of said ends of said motor to the fluid under pressure moving said piston toward the discharge opening of said housing, the other of said outlet ports being connected to said pump means for generating a signal when the other of said oulet ports is vented;
  (c) discharge valve means inserted between said chamber and said discharge opening and operable simultaneously for actuation of said motor means to discharge the motor;
  (d) trigger means associated with said housing for selectively actuating said motor means and discharging said measured quantity of substance in said chamber to be discharged; and
  (e) signal means associated with said trigger means and connectable to a pump arranged for feeding a premeasured quantity of substance thereby feeding such amount into said chamber of said housing when said trigger means is released immediately following discharge of said measured quantity previously in said chamber.

7. Apparatus as defined in claim 6, further including discharge valve means inserted between said chamber and said discharge opening and operable simultaneously yet actuation of said motor means to discharge the motor.

* * * * *